(12) United States Patent
Ybert

(10) Patent No.: US 6,193,326 B1
(45) Date of Patent: Feb. 27, 2001

(54) APPARATUS FOR BRAKING A SET OF AIRCRAFT WHEELS

(75) Inventor: Franck Ybert, Chatenay-Malabry (FR)

(73) Assignee: Messier-Bugatti, Velizy Villacoublay (FR)

( * ) Notice: Subject to any disclaimer, the term of this patent is extended or adjusted under 35 U.S.C. 154(b) by 0 days.

(21) Appl. No.: 09/227,191

(22) Filed: Jan. 8, 1999

(30) Foreign Application Priority Data

Jan. 12, 1998 (FR) .................................................. 98 00197

(51) Int. Cl.⁷ ............................ B60T 13/66; B60T 11/24; B60T 15/36; B64C 25/42; B64C 25/44
(52) U.S. Cl. ........................ 303/15; 303/126; 303/6.01; 303/9.61; 303/14
(58) Field of Search .................... 303/126, 6.01, 303/9.61, 13–15, 16–17, 117.1, 10–12, 119.2, 119.3; 244/111; 188/106 P, 3.4, 16, 354; 701/7, 70, 75, 79

(56) References Cited

U.S. PATENT DOCUMENTS

| | | |
|---|---|---|
| 3,656,813 | 4/1972 | Gachot et al. . |
| 3,807,810 * | 4/1974 | Yarber ................................. 244/111 |
| 3,880,475 * | 4/1975 | Booher ................................. 244/111 |
| 3,926,479 * | 12/1975 | Bissell et al. ........................ 244/111 |
| 4,269,455 * | 5/1981 | Beck et al. .......................... 303/126 |
| 4,548,089 * | 10/1985 | Vanderlaan . |
| 4,572,585 * | 2/1986 | Guichard ................................. 303/3 |
| 4,640,475 * | 2/1987 | Zoerb ................................. 303/117.1 |
| 4,792,192 * | 12/1988 | Tveitane ................................. 303/14 |
| 4,834,465 | 5/1989 | Guichard et al. . |
| 5,020,322 * | 6/1991 | Schwarz . |
| 5,024,491 * | 6/1991 | Pease, Jr. et al. . |
| 5,044,697 * | 9/1991 | Longyear et al. ....................... 303/14 |
| 5,050,940 * | 9/1991 | Bedford et al. ....................... 244/111 |
| 5,397,173 * | 3/1995 | Bourguet ................................. 244/111 |
| 5,417,477 * | 5/1995 | Lasbleis ................................. 303/3 |
| 5,456,523 * | 10/1995 | Boehringer .............................. 303/14 |
| 5,722,744 | 3/1998 | Kupfer et al. . |

FOREIGN PATENT DOCUMENTS

| | | |
|---|---|---|
| 1118020 * | 11/1961 | (DE) . |
| 3939091 | 5/1991 | (DE) . |
| 4445975 | 6/1996 | (DE) . |
| 0443213 * | 8/1991 | (EP) . |
| 0928740 * | 7/1999 | (EP) . |
| 11314599 * | 11/1999 | (JP) . |

\* cited by examiner

Primary Examiner—Douglas C. Butler
(74) Attorney, Agent, or Firm—Nixon Peabody LLP; Stuart J. Friedman

(57) ABSTRACT

The invention relates to apparatus for braking a set of aircraft wheels, the apparatus comprising a normal hydraulic circuit and an emergency hydraulic circuit, both circuits leading to each of the various brakes via associated brake valves. According to the invention, the brake valves of the normal circuit and/or of the emergency circuit are constituted by direct drive valves that are electrically controlled by an associated electronic control unit.

8 Claims, 4 Drawing Sheets

FIG_4
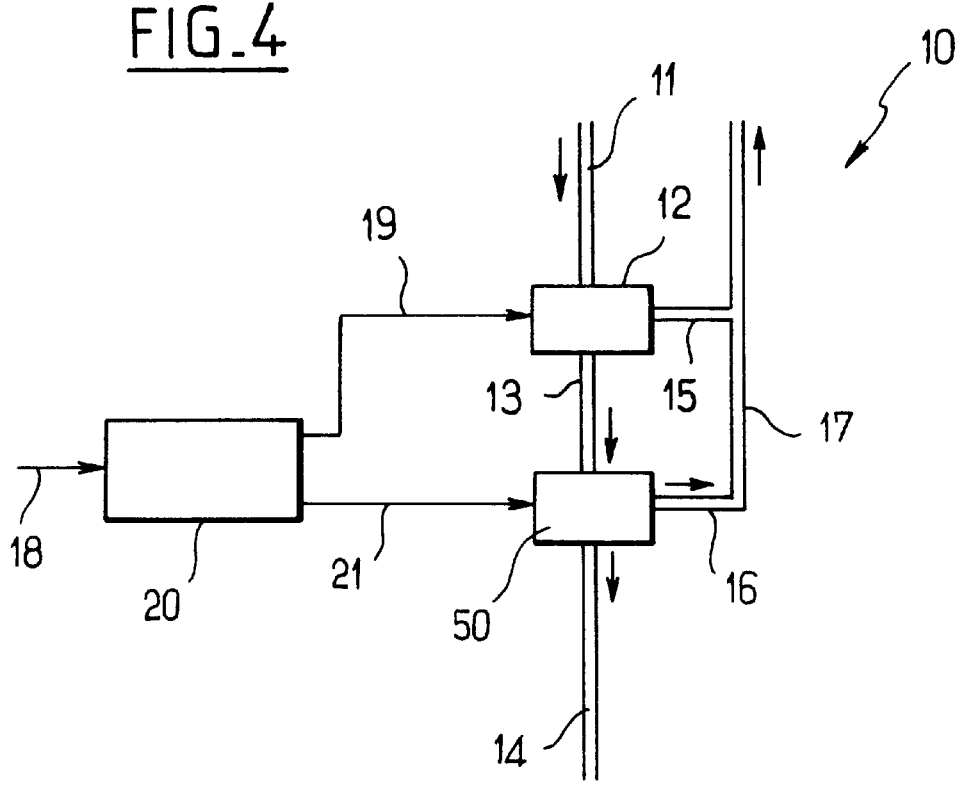
FIG_5
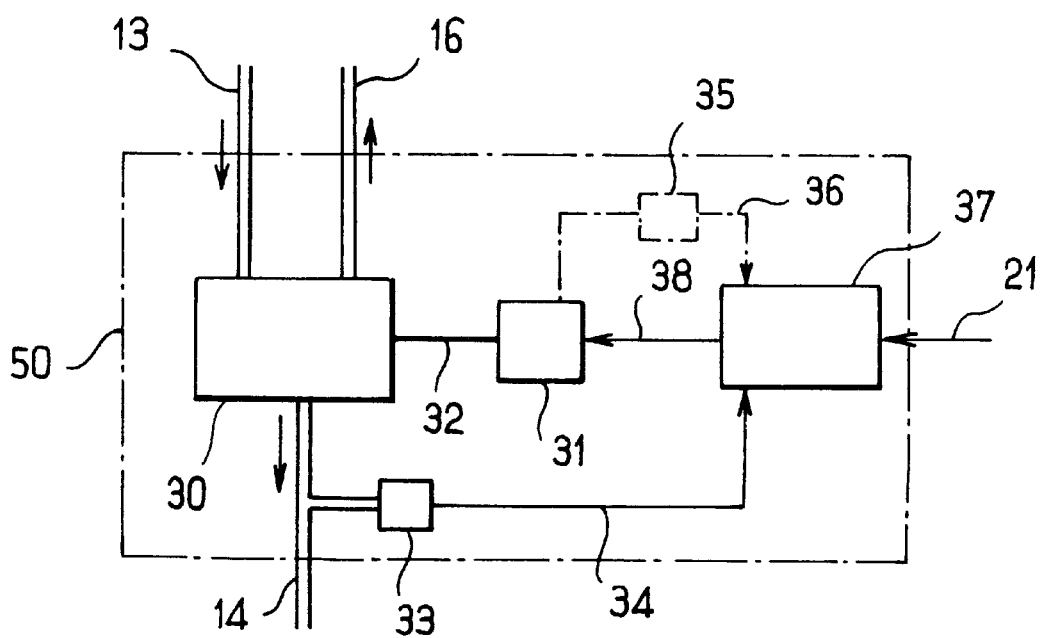

APPARATUS FOR BRAKING A SET OF AIRCRAFT WHEELS

The present invention relates to controlled braking of a set of aircraft wheels, and more particularly it relates to apparatus for braking a set of wheels in which the wheels are generally distributed in two groups organized symmetrically on either side of a longitudinal midplane of the aircraft, of the type in which each wheel is fitted with a brake actuated by means of brake pedals.

BACKGROUND OF THE INVENTION

There already exist numerous brake apparatuses fitted with a first hydraulic circuit powered by an associated hydraulic source and used for braking under normal conditions, and with an emergency hydraulic circuit powered by a different source of hydraulic pressure and used only in the event of a breakdown.

Traditionally, each of the two hydraulic circuits (normal and emergency) is connected to each of the various brakes via a brake valve which is a servo-valve that is electrically controlled by a cockpit unit which measures information corresponding to brake pedal depression, and in general also to the speed of the wheel in question. For the state of the art, reference can be made to the following documents: EP-A-0 443 213, U.S. Pat. Nos. 4,834,465, 5,050,940, 5,024,491, 3,926,479, FR-A-2 038 001, and DE-B-1 118 020. Another example of a particularly elaborate electro-hydraulic brake apparatus for a set of aircraft wheels is described in the Applicant's document U.S. Pat. No. 5,397,173.

The various brake apparatuses described in the above-mentioned documents thus comprise electrically controlled servo-valves of structure that always has two hydraulic stages interconnected by a hydraulic link and respectively associated with control and with distribution, the control stage acting on the slider of the distribution stage. The hydraulic control stage is electrically controlled, and the feed pressure input to the servo-valve is modulated in the distribution stage by through sections (nozzles) operating on the principle of hydraulic leakage that is generally at a rate of about one liter per minute. Such hydraulic leakage is always required in that kind of design, and the magnitude thereof makes it difficult to use such servo-valves when the hydraulic source is constituted by a hydraulic accumulator, as may be the case for an emergency circuit. The volume of fluid consumed by the permanent leakage of such servo-valves is no longer available for powering the brakes, thereby considerably diminishing the duration and number of times the brakes can be applied before the accumulator has been emptied.

Although the structure of presently-used braking servo-valves is generally well understood, specialists are fully aware of the drawbacks and operating constraints on brake valves of those types.

The operating pressure recovered at the outlet from a servo-valve, which pressure is a function of the magnitude of the reference current, is, in fact, obtained with relatively poor accuracy. Firstly, the mechanical adjustment of the servo-valve nozzles cannot achieve dispersion on utilization pressure of less than a few bars, or indeed of about ten bars at some points, given the non-linearity and hysteresis phenomena specific to any type of hydraulic equipment. Furthermore, the servo-valve is sensitive to fluctuations in the feed pressure and in the temperature of the hydraulic fluid, which can give rise to operating pressure variations of several bars, even in normal operation. Finally, mechanical wear of the nozzles inevitably gives rise to drift over time.

OBJECTS AND SUMMARY OF THE INVENTION

The invention seeks specifically to solve this problem and to design brake apparatus that provides better performance, while being less sensitive to the phenomena of temperature and wear, and to fluctuations in feed, and while nevertheless remaining very accurate concerning operating pressure, without it being necessary to perform difficult periodic adjustments.

An object of the invention is thus to provide apparatus for breaking a set of aircraft wheels, in which the structure of the apparatus makes it possible to obtain braking that is precise and constant over time, while avoiding the above-mentioned drawbacks inherent to using brake servo-valves having two hydraulic stages.

According to the invention, this problem is solved by braking apparatus for braking a set of aircraft wheels, in which each wheel is fitted with a brake actuated from brake pedals, said braking apparatus comprising two pressure sources each feeding a respective hydraulic circuit, comprising a normal circuit and an emergency circuit for use in the event of a breakdown, the two hydraulic circuits leading to each of the various brakes via associated brake valves, the brake valves of the normal circuit and/or of the emergency circuit being constituted by direct drive valves that are electrically controlled by associated electronic control units.

Surprisingly for the person skilled in the art, direct drive valves (DDVs) are highly effective when integrated in aircraft braking systems. Until now, such direct drive valves have been used only in machine tools for controlling position or displacement (e.g. in rolling mills), or else in motor vehicle suspensions. In known uses of such direct drive valves, provision is generally made for servo-controlling flow rate (not pressure), in which the position of the valve slide is monitored by a position sensor.

In a first embodiment of the brake apparatus of the invention, the brake valves of the emergency circuit are the only valves constituted by direct drive valves, with the brake valves of the normal circuit being servo-valves of traditional type. This provides a considerable advantage resulting from the difficulty in using conventional servo-valves with two hydraulic stages in the emergency circuit, when the hydraulic source of the circuit is constituted by a hydraulic accumulator. Provision can then be made for each of the direct drive brake valves to be associated with the brakes of a pair of wheels.

In a variant embodiment, the brake valves of the normal circuit and of the emergency circuit are all constituted by direct drive valves. This provides numerous advantages which are described in greater detail below, inherent to using direct drive valves for the entire brake circuit, i.e. both for normal use and for use in the event of a breakdown.

According to advantageous characteristic, at least some of the direct drive valves are servo-controlled in pressure.

Such pressure servo-control is extremely advantageous when direct drive brake valves are used in a brake circuit, unlike position servo-control as is sometimes used for such valves in technological environments that are completely different.

Under such circumstances, each pressure servo-controlled direct drive valve preferably includes a hydraulic distributor valve and an actuating electric motor controlled by associated control electronics, and on the delivery outlet of the hydraulic distributor valve, a pressure sensor which provides said control electronics with an electrical signal representative of the measured pressure. Where desirable, the direct drive valve under pressure servo-control could also be subjected to position control by means of a position sensor associated with the actuating electric motor which sends a corresponding electrical signal to the associated control electronics.

Since the direct drive valve does not have the first hydraulic stage of traditional servo-valves (e.g. a quadruple hydraulic potentiometer), the power for controlling the slide of the valve is now electrical (it is constituted solely by controlling the motor for driving the slide) and no longer hydraulic (by leakage from the first hydraulic stage of the servo-valve). In addition, contrary to that which is encountered with traditional servo-valves whether or not they are servo-controlled in pressure, leakage from a direct drive valve (feed to return) is now restricted to the slide of the valve, and is thus by construction less than the leakage of a traditional servo-valve. This opens the way to genuine electrical braking, in particular in the emergency circuit where the feed is of limited volume, e.g. by using a hydraulic accumulator, which until now has been too restrictive for traditional servo-valves because of the need to increase considerably the hydraulic volume available in the feed, in particular by increasing the capacity of the hydraulic accumulator.

According to another advantageous characteristic, a parking brake circuit is combined with the emergency circuit using a common feed, said parking brake circuit leading to each of the wheel brakes via an associated shuttle check valve disposed downstream from the corresponding direct drive valve.

BRIEF DESCRIPTION OF THE DRAWINGS

Other characteristics and advantages of the invention appear more clearly in the light of the following description and the accompanying drawings, relating to particular embodiments of the invention, in which:

FIG. 4 is an isolated diagrammatic view showing how a direct drive valve can be integrated in an electrical type brake circuit; and FIG. 5 is another fragmentary diagrammatic view showing a direct drive valve with its electric motor and its hydraulic slide, together with its control and servo-control members.

MORE DETAILED DESCRIPTION

Figure 1:
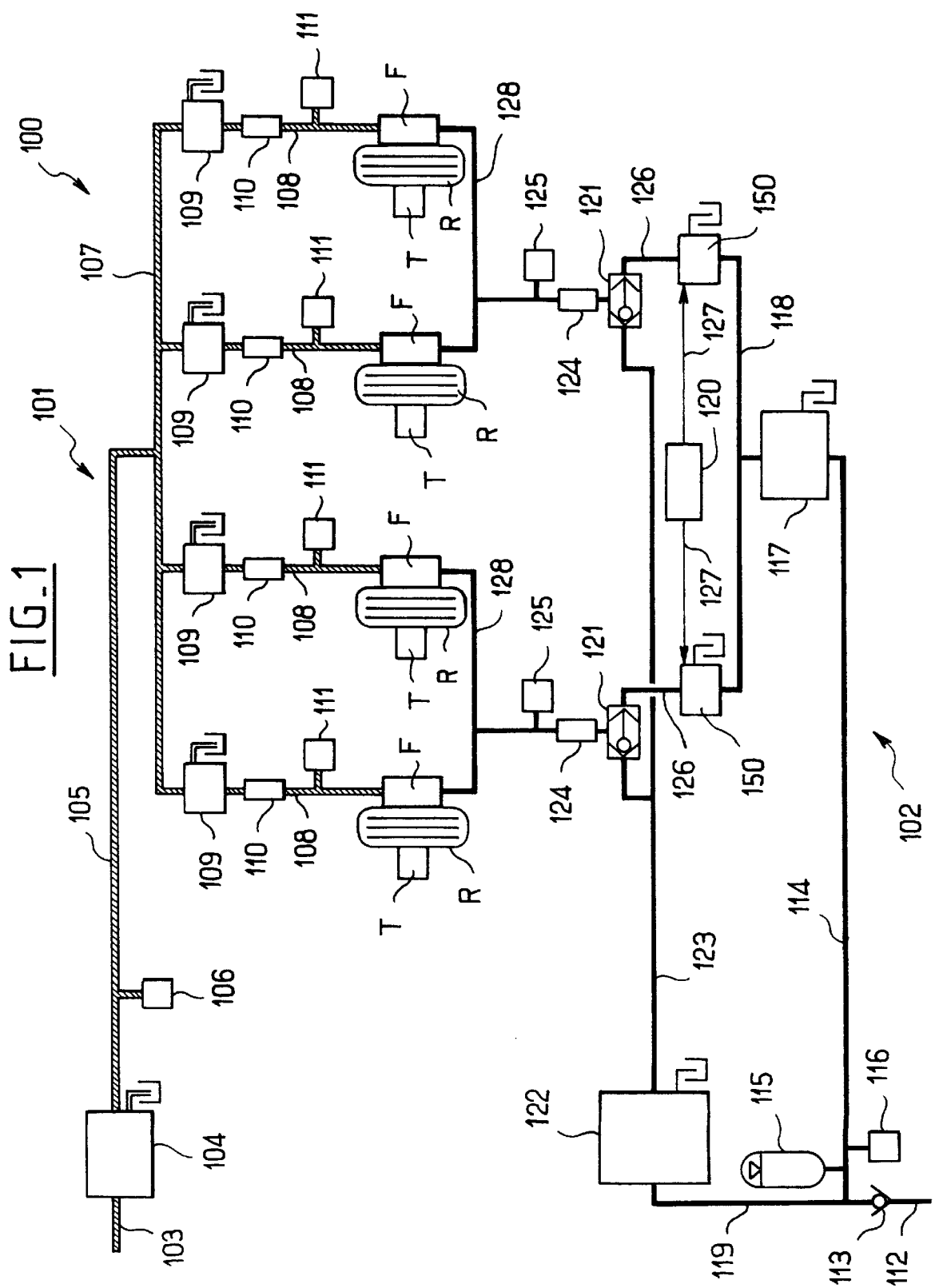
FIG. 1 is a diagram of a first embodiment of the brake apparatus of the invention in which the direct drive valves apply to the emergency circuit only.

FIG. 1 shows brake apparatus for a set of aircraft wheels, and by way of example there is shown a set comprising two pairs of wheels R, one pair being to the left and the other to the right of the aircraft. The brake of each wheel is marked F and is actuated using brake pedals that are not shown herein. It will be observed that in this case, each wheel is fitted with a tachometer T, each of which delivers information relating to the speed of the corresponding wheel to electronic control members.

The brake apparatus given overall reference 100 has two sources of pressure, each feeding a hydraulic circuit. Thus, there is a "normal" hydraulic circuit 101 and a "emergency" hydraulic circuit 102 for use in the event of a breakdown.

Specifically, the normal circuit 101 is organized in conventional manner, in particular concerning its brake servo-valves referenced 109, each associated with a respective wheel brake. The various components of this hydraulic circuit 101 are therefore outlined below only briefly.

The input of the circuit, referenced 103, leads to a solenoid valve 104, downstream from which there is a branch 105 fitted with a pressure sensor 106. The branch 105 leads to a common branch 107 feeding in parallel as many branches 108 as there are wheels concerned (four in this case). Each branch 108 comprises in succession a traditional type of servo-valve 109 having two hydraulic stages, downstream from which there is a hydraulic fuse 110, and a tapping point for a pressure sensor 111.

The emergency circuit 102 comprises a hydraulic source which is constituted in this case by a hydraulic accumulator. The emergency circuit 102 comprises, more precisely, an inlet 112 feeding to a check valve 113, downstream from which there is a first branch 114 fitted with an accumulator 115 and a pressure sensor 116, and leading to a solenoid valve 117 which is analogous to above-mentioned solenoid valve 104. The other branch 119 leads to a parking solenoid valve 122, downstream from which there is a branch 123 leading to the inlets of two shuttle check valves 121, downstream from which there are respective hydraulic fuses 124 and pressure sensors 125, prior to reaching respective branches 128 leading to the brakes F of the wheels.

At the outlet from the solenoid valve 117, there is a branch 118 leading to two valves 150 which, in accordance with the characteristic of the invention, are direct drive valves (DDVs). Each of these direct drive valves 150 is electrically controlled by an associated electronic control unit referenced 120 (in this case the unit is common to two valves), by means of links referenced 127. As explained in greater detail below with reference to FIG. 5, each direct drive valve 150 is preferably fitted with an electronic control unit internal to the valve, for applying pressure servo-control to the direct drive valve and receiving pressure orders from the associated electronic control unit 120. The hydraulic delivery outlet from each of the valves 150 is referenced 126 and leads to the opposite inputs of the above-mentioned shuttle check valves 121.

Thus, with the embodiment shown in FIG. 1, the brake valves of the emergency circuit 102 are constituted by direct drive valves (in this case two valves 150), while the brake valves of the normal circuit 101 are servo-valves 109 of traditional type.

In addition to the simplification of the emergency circuit 102 that derives from using direct drive valves instead of traditional servo-valves, numerous practical advantages are obtained that are inherent to the structure of this particular type of valve, and which will be better understood in the light of the general description below of diagrammatic FIGS. 4 and 5.

FIG. 4 shows a portion of the hydraulic brake circuit referenced 10, having a feed pipe 11 reaching a solenoid valve 12. The delivery outlet from the solenoid valve, referenced 13, leads to a direct drive valve 50, and the return outlet from the solenoid valve 12 is referenced 15. The delivery outlet of the direct drive valve 50 is referenced 14 and leads to the brake(s) concerned, while said valve's return outlet, referenced 16, leads to a pipe 17 in common with the return outlet 15 of the solenoid valve 12. An electronic control unit 20 receives electrical brake orders under the control of the pilot, as symbolized by arrow 18. This electronic control unit 20 can thus send an opening order to the upstream solenoid valve 12, as symbolized by line 19, and a pressure order to the direct drive valve 50 (or more exactly to the internal electronic control unit thereof), as symbolized by the line 21.

FIG. 5 serves to provide a better understanding of the organization of the above-mentioned direct drive valve 50. In this case, the valve 50 is represented by a rectangle in chain-dotted lines, and it essentially comprises a hydraulic distributor valve 30 and an electrical actuator motor 31 connected to the distributor valve via a mechanical link 32. The mechanical link 32 is represented diagrammatically, but it will readily be understood that this type of link covers any kind of conventional mechanical device capable of transforming rotary motion into linear motion, rotary motion into another rotary motion, or linear motion into another linear motion, thus acting as appropriate on the linear spool or rotary plug constituting the slide of the hydraulic distributor valve 30. The distributor valve 30 is connected to the high pressure hydraulic feed 13, to the delivery outlet 14, and to the low pressure return outlet 16, all of which are shown in FIG. 4. The distributor valve 30 is the sole hydraulic stage of the direct drive valve 50, unlike traditional servo-valves which have two hydraulic stages. The direct drive valve 50 also has controlling electronics referenced 37, inside said valve, which electronics receives pressure orders delivered by the control unit 20 via the line 21 shown in FIG. 4. The hydraulic drive motor 31 is thus controlled by the associated control electronics 37, as represented by arrow 38.

Although not essential, it is advantageous to provide for the direct drive valve 50 to be servo-controlled in pressure via the associated internal control electronics.

Specifically, the direct drive valve 50 thus further includes a pressure sensor 33 responsive to the pressure in the delivery outlet 14 from the distributor valve 30, which sensor provides an electrical signal representative of the pressure it measures to the control electronics 37, as represented by line 34. In this way, the electrical order delivered by the control electronics 37 to the electrical actuator motor 31 takes account at all times of the delivery pressure as measured by the pressure sensor 33. The pressure sensor 33 which consumes little power, can provide very high accuracy, of the order of one bar, over the entire operating range (traditional servo-valves are known to present error that can be as great as about ten bars at certain points in the operating range). The pressure sensor 33 can also include an integrated member for temperature correction so as to eliminate any harmful influence of or sensitivity to temperature (it is recalled that traditional servo-valves are extremely sensitive to temperature, with this influence being of the order of a few bars per dozen degrees Celsius). The direct drive valve 50 is also much less sensitive to feed fluctuations than are traditional servo-valves having two hydraulic stages, because of the pressure servo-control achieved via the pressure sensor 33. When the pressure sensor 33 is provided, this sensor is placed downstream from the distributor valve, which enhances insensitivity to variations in pressure.

The person skilled in the art will understand that providing pressure servo-control for the direct drive valve is not essential for such a valve, since it is capable of operating with a position sensor in flow rate servo-control mode, however that would require a pressure servo-control loop to be added outside the direct drive valve since brake control requires pressure in the brakes to be controlled. That is why it is generally preferable to use internal pressure servo-control, as described above.

Thus, with the direct drive valve 50, the wear phenomena that were inherent to the presence of nozzles in traditional servo-valves are no longer to be found, and as a result there are no longer any problems of drift over time. Furthermore, because of this type of direct drive valve, it is generally possible to omit periodic adjustments of the kind that has been essential with traditional servo-valves, it now sufficing for the computer merely to perform periodic verifications.

FIG. 1 shows that it is most advantageous to use direct drive valves 150 for the emergency circuit 102. This is particularly true when it is recalled that traditional servo-valves are associated with the principle of the need for permanent hydraulic leakage, which is no longer the case with direct drive valves. Naturally there remains a certain amount of leakage associated with the spool or plug in each direct drive valve, however such leaks are very small compared with the 0.5 to 1 liter per minute leakage rates commonly encountered with traditional servo-valves, with the leaks associated with the spool or plug now representing about one-tenth of the return leakage to be found with a conventional servo-valve.

Figure 2:
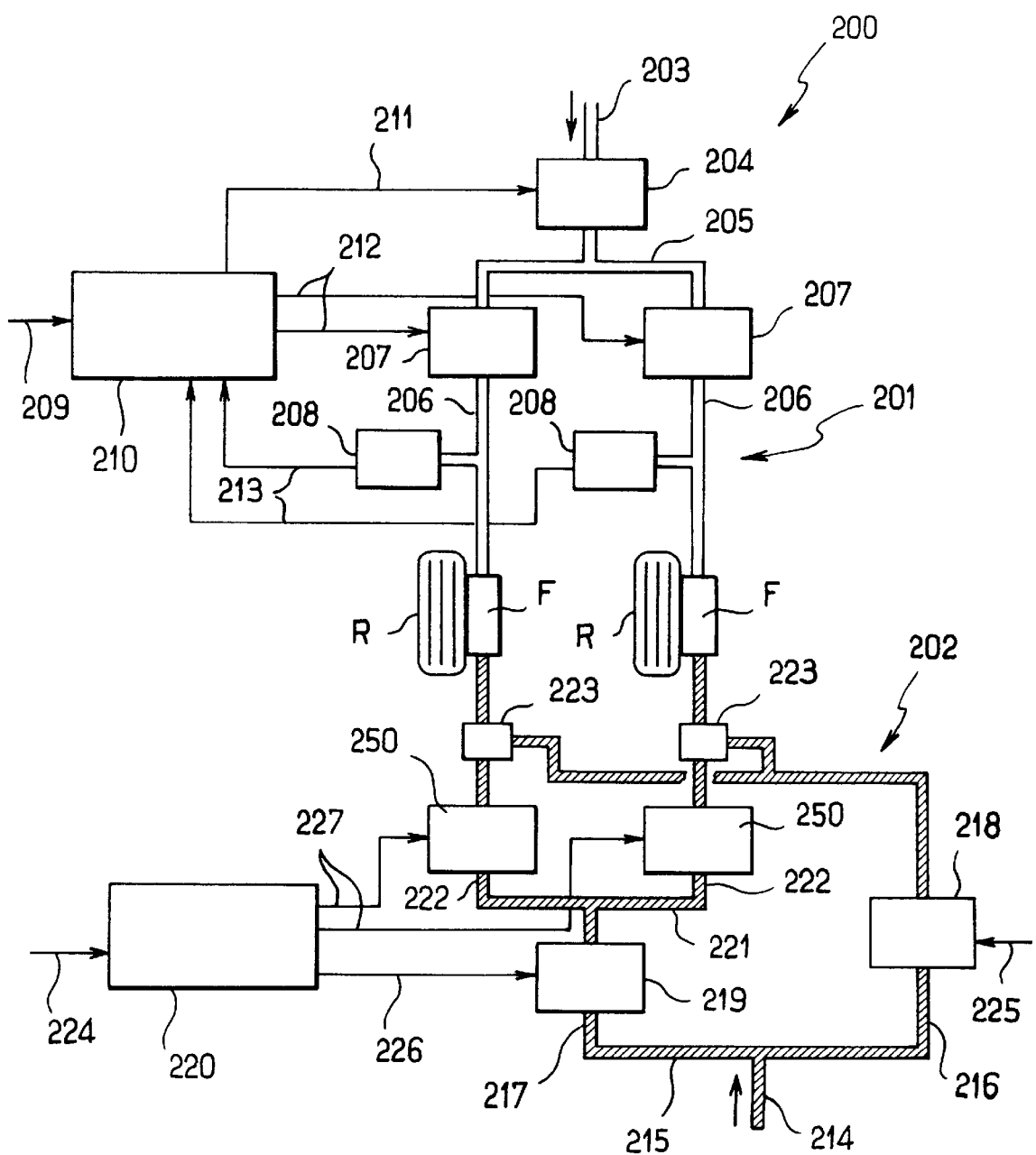
FIG. 2 is a diagram analogous to that of FIG. 1, showing the control unit of the normal circuit.

With reference to FIG. 2, there follows a description of brake apparatus analogous to that of FIG. 1, with the control unit associated with the normal circuit of the brake apparatus. The circuit 200 shown in FIG. 2 comprises a normal circuit 201 and an emergency circuit 202.

In the normal circuit 201, there can be seen a feed pipe 203 leading to a solenoid valve 204, downstream from which a common branch 205 feeds two pipes 206 fitted firstly with a servo-valve 207 and secondly with a pressure sensor 208. Electrical brake orders issued by the pilot, symbolized by line 209, reach an electronic control unit 210 of the normal circuit. Control orders applied to the solenoid valve 204 and to the servo-valves 207 are symbolized by lines 211 and 212, respectively. The control electronic unit 210 also receives electrical signals from two pressure sensors 208, as represented by lines 213.

For the emergency circuit 202, as in FIG. 4, there can be seen an electronic control unit of the emergency circuit 220 which receives electrical brake orders under the control of the pilot, as represented by line 224, and which delivers pressure orders to each of the two direct drive valves 250 of the emergency circuit.

The emergency circuit 202 has a feed inlet 214 leading to a common branch 215 which feeds two branches 216 and 217. The branch 217 includes a solenoid valve 219 which receives electrical control signals from the electronic control unit 220, as represented by line 226. Downstream from solenoid valve 219, there is a common branch 221 serving two branches 222 each fitted with a direct drive valve 250, and downstream therefrom with a shuttle check valve 223. The direct drive valves 250 receive respective electrical control orders from the control unit 220 as represented by lines 227.

The presence of the electronic control unit 210 (for the normal circuit) and 220 (for the emergency circuit) show that electrical braking is thus being used in this case also.

This is even more true in that it is also possible to include a parking brake circuit in the emergency circuit 202, as shown in FIG. 2, with control of the parking brake being applied in the form of electrical brake orders issued by the pilot. Thus, downstream from the above-mentioned common branch 215 of the circuit 202 there can be seen a second side branch 216 leading to a parking brake distributor valve 218, downstream from which the pipe is duplicated so as to be connected to the above-mentioned shuttle check valves 223. The distributor valve 218 receives an electrical parking brake order issued by the pilot, as represented by line 225.

Because of the two shuttle check valves 223, it is easy to obtain the desired mode of braking, whether it is a parking brake under normal circumstances or emergency braking in the event of a breakdown.

Figure 3:
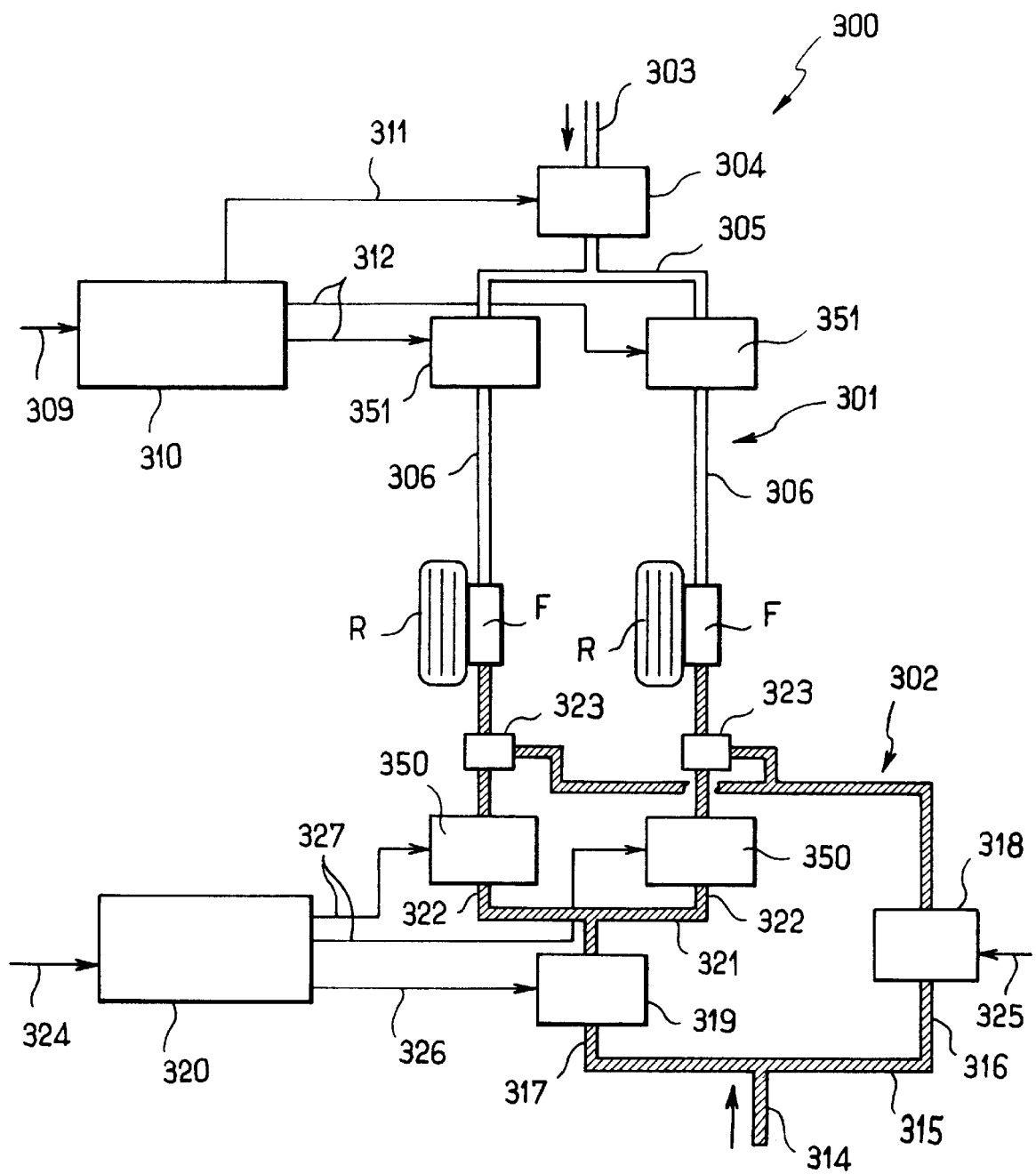
FIG. 3 shows a variant of FIG. 2 in which the brake valves of the normal circuit are also direct drive valves.

FIG. 3 shows another variant of the brake apparatus of the invention, with this variant being very similar to that described above with reference to FIG. 2. The main difference compared with the circuit 200 as described above lies in the traditional type servo-valves 207 in the normal circuit being replaced by direct drive brake valves 351 analogous to the valves referenced 350 already provided in the emergency circuit 302. Thus, the circuit 300 of FIG. 3 has a normal circuit 301 that is also fitted with direct drive valves 351. The other members shown in FIG. 3 correspond exactly to those of the circuit 200 shown in FIG. 2, and the same references plus 100 are used for components that correspond, and that are therefore not described again.

In FIG. 3, the brake valves of the normal circuit 301 and of the emergency circuit 302 are thus all constituted by direct drive valves given respective references 351 and 350. Electric braking is thus obtained taking full advantage of traditional servo-valves having two hydraulic stages being replaced by direct drive valves as described above.

Although not shown, provision could also be made in another variant for the normal circuit to be the only circuit fitted with direct drive valves, while the emergency circuit is fitted in traditional manner. Nevertheless, the above-mentioned advantages conferred by using direct drive valves would be much less apparent.

For each of the above-mentioned direct drive valves 150, 250, 350, and 351, it is advantageous to provide pressure servo-control that is internal to the direct drive valve, as already described in greater detail for the direct drive valve 50 described with reference to FIG. 5.

Provision could even be made for each of the direct drive valves to have a second servo-control loop to provide additional control, as shown in FIG. 5: by using a position sensor 35 associated with the electrical actuator motor 31 it is possible to perform position servo-control internally, with the position sensor delivering a corresponding electrical signal to the associated control electronics 37, as represented by line 36, this additional servo-control loop being represented by chain-dotted lines so as to underline its optional nature. In a variant, provision could be made for the second servo-control loop which acts on position to rely not on the electrical motor 31 but on the distributor valve 30, for the purpose of sending a corresponding electrical signal to the control electronics 37. The additional control means obtained by the second servo-control loop further improves accuracy and dynamic response.

An electrically controlled brake apparatus is thus provided which, by using direct drive valves at least in a portion of its hydraulic circuit, ensures a large number of technical advantages which are merely outlined below for the purpose of demonstrating the improvement provided thereby compared with conventional use of servo-valves in the hydraulic brake circuits of aircraft.

Better accuracy is now obtained with no drift over time. Low sensitivity to temperature fluctuations and to feed pressure fluctuations is also obtained. Finally, there is no need to perform hydraulic adjustments to the static characteristic of the valve, as has naturally been required with traditional servo-valves having two hydraulic stages.

In addition, since direct drive valves do not have a first hydraulic stage, unlike traditional servo-valves (e.g. of the quadruple hydraulic potentiometer type), the power that controls the slide of the valve is electrical (in this case motor control) instead of being hydraulic (leakage from the first stage). The very small amount of leakage from the direct drive valve, restricted to the slide thereof, considerably facilitates implementing an electrical braking mode using a feed circuit that is limited in volume (e.g. constituted by a hydraulic accumulator).

The invention is not limited to the embodiments described above, but on the contrary covers any variant using equivalent means to reproduce the essential characteristics specified above.

What is claimed is:

1. Braking apparatus for braking a set of aircraft wheels, in which each wheel is fitted with a brake actuated from brake pedals, said braking apparatus comprising two pressure sources each feeding a respective hydraulic circuit, comprising a normal circuit and an emergency circuit for use in the event of a breakdown, the two hydraulic circuits leading to each of various brakes via associated brake valves, wherein the brake valves of the normal circuit and/or of the emergency circuit are constituted by direct drive valves that are electrically controlled by associated electronic control units.

2. Apparatus according to claim 1, wherein the brake valves of the emergency circuit are the only valves constituted by direct drive valves, with the brake valves of the normal circuit being servo-valves.

3. Apparatus according to claim 2, wherein each of the direct drive brake valves is associated with the brakes of a pair of wheels.

4. Apparatus according to claim 1, wherein the brake valves of the normal circuit and of the emergency circuit are all constituted by direct drive valves.

5. Apparatus according to claim 1, wherein at least some of the direct drive valves are servo-controlled in pressure.

6. Apparatus according to claim 5, wherein each pressure servo-controlled direct drive valve includes a hydraulic distributor valve and an actuating electric motor controlled by associated control electronics, and on the delivery outlet of the hydraulic distributor valve, a pressure sensor which provides said control electronics with an electrical signal representative of the measured pressure.

7. Apparatus according to claim 6, wherein the pressure servo-controlled direct drive valve is also positioned servo-controlled by means of a position sensor associated with the actuator electric motor, which sensor delivers a corresponding electrical signal to the associated control electronics.

8. Apparatus according to claim 1, wherein a parking brake circuit is combined with the emergency circuit using a common feed, said parking brake circuit leading to each of the wheel brakes via an associated shuttle check valve disposed downstream from the corresponding direct drive valve.

* * * * *